J. G. GOODHUE AND H. L. TRUBE.
PREPARATION OF FOOD AND FOOD PRODUCTS.
APPLICATION FILED NOV. 19, 1917.
1,365,910.
Patented Jan. 18, 1921.
3 SHEETS—SHEET 1.
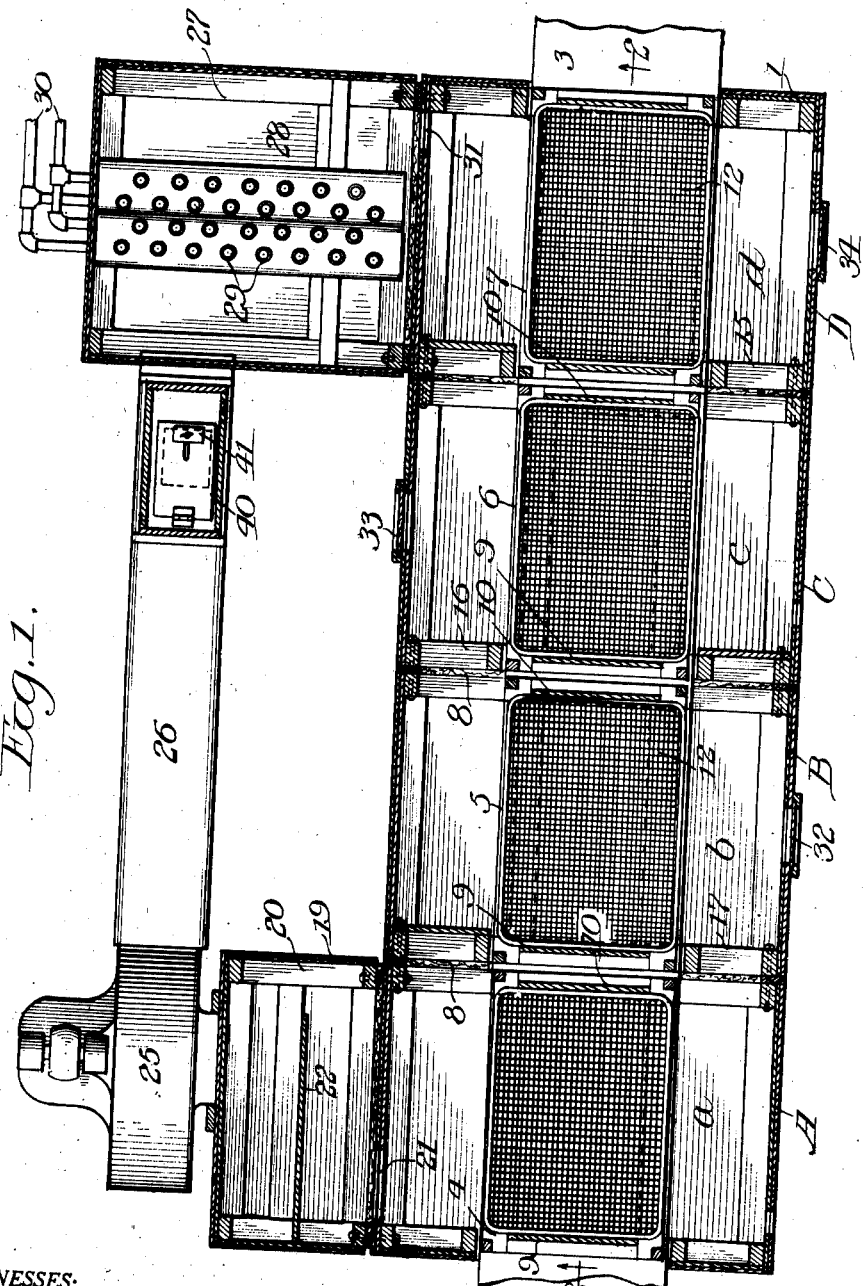
WITNESSES:
INVENTOR.
BY
ATTORNEYS.

J. G. GOODHUE AND H. L. TRUBE.
PREPARATION OF FOOD AND FOOD PRODUCTS.
APPLICATION FILED NOV. 19, 1917.
1,365,910.
Patented Jan. 18, 1921.
3 SHEETS—SHEET 2.
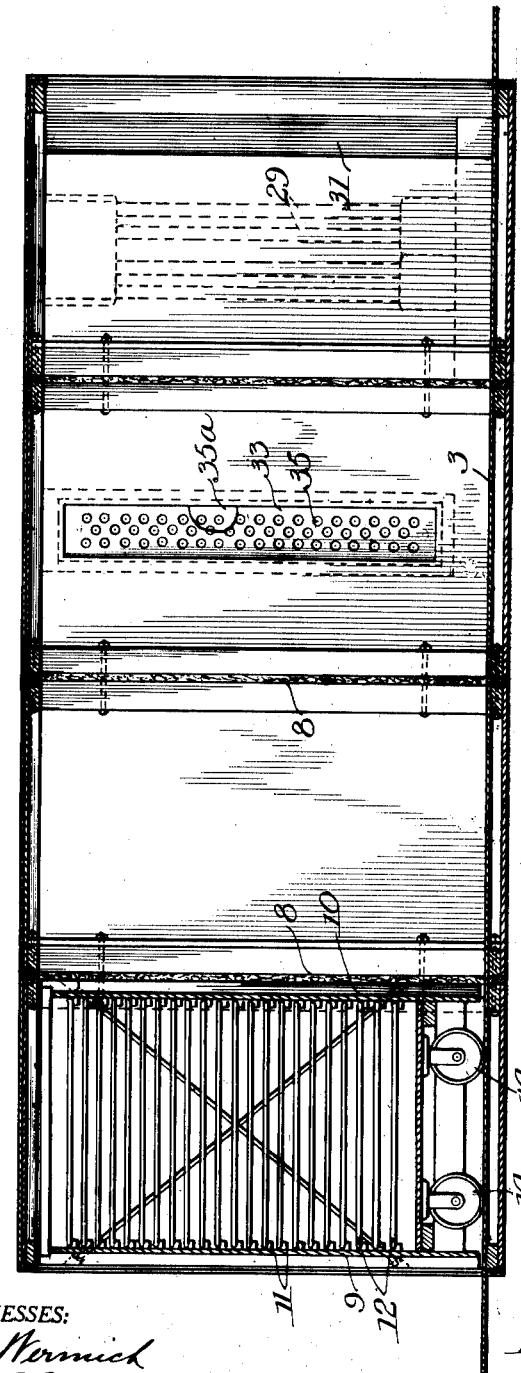
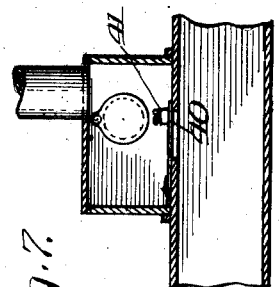

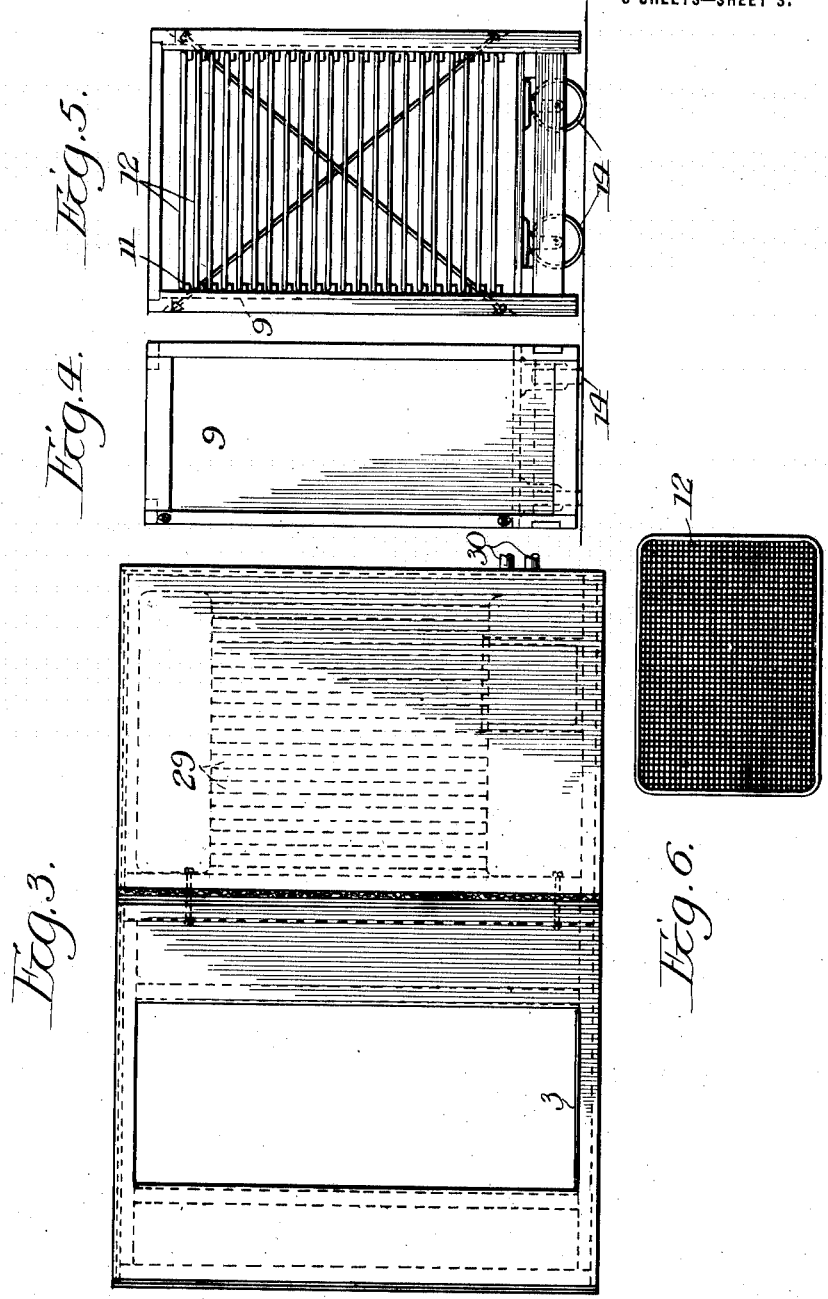

UNITED STATES PATENT OFFICE.

JULIAN G. GOODHUE AND HERBERT L. TRUBE, OF CHICAGO, ILLINOIS; SAID TRUBE ASSIGNOR TO SAID GOODHUE.

PREPARATION OF FOOD AND FOOD PRODUCTS.

1,365,910.  Specification of Letters Patent.  Patented Jan. 18, 1921.

Application filed November 19, 1917. Serial No. 202,727.

*To all whom it may concern:*

Be it known that we, JULIAN G. GOODHUE and HERBERT L. TRUBE, citizens of the United States, residing at Chicago, in the county of Cook and State of Illinois, have invented a certain new and useful Improvement in the Preparation of Food and Food Products, of which the following is a full, clear, concise, and exact description, reference being had to the accompanying drawings, forming a part of this specification.

Our invention relates to the preparation of food and food products, especially by dehydrating the same.

One of the objects of the invention is to provide a simple and practical process and apparatus for dehydrating food articles or other material.

Another object of the invention is to obtain large capacity while retaining simplicity of construction and operation.

Another object of the invention is to secure a high degree of efficiency and also to secure facility in handling the material to be treated, both in introducing the same into the apparatus, in moving it through the same and in withdrawing it therefrom in its final form.

In the accompanying drawings Figure 1 is a horizontal section of an apparatus embodying our present invention, in which apparatus our novel process may be carried out;

Fig. 2 is a vertical section of the same taken on line 2—2 in Fig. 1;

Fig. 3 is an end elevation of the apparatus;

Figs. 4 and 5 are respectively side and front elevations of a truck or car forming a part of the apparatus;

Fig. 6 is a plan view of a tray used in such truck or car; and

Fig. 7 is a section of a detail of construction.

Referring to the drawings we show an apparatus having a housing 1, which may be of any preferred form or construction, but is preferably made of wood or sheet metal and is rectangular in shape. This housing consists of a plurality of sections A, B, C and D. The end sections A and D are so constructed as to form the end portions of the housing 1 and the intermediate sections B and C are so constructed as to fit between the end sections A and D and form one complete structure of uniform width and height. The casing sections A, B, C and D, respectively, provide treatment chambers $a$, $b$, $c$ and $d$, in which the material such as food articles or the like is to be treated. A sheet iron floor 3 runs lengthwise of the housing 1 entering the same at the section A and extending through the various sections and leaving at the section D. This floor supports cars or trucks 4, 5, 6 and 7, which cars or trucks have a length substantially equal to the width of the sections A, B, C and D, so that the cars extend across substantially the width of the respective treatment chambers, the car 4 for example, being in the treatment chamber $a$, the car 5 in the treatment chamber $b$, and so on. The ends of the cars fit closely the adjacent walls of the various sections A, B, etc., so as to form close or tight joints between the cars and said walls and thereby provide substantially air tight joints between the several treatment chambers when the cars are in place.

The cars 4, 5, 6 and 7 preferably constructed as shown in Figs. 4 and 5 and consist of upright closed end walls 9 and 10 provided with series of supports or projections 11 and trays 12 arranged to rest and slide on said projections 11. The sides of the cars between the end walls 9 and 10 are open so as to permit the circulation of air or gas between the end walls 9 and 10 and between the trays 12 and over and under the material thereon. These cars are provided with wheels 14 by which they may be readily moved along the floor 3.

Certain openings are provided between the several treatment chambers $a$, $b$, $c$ and $d$, to permit a circulation of drying currents from chamber to chamber. As a preferred arrangement an opening 15 is provided between the chambers $c$ and $d$ and an opening 16 between the chambers $b$ and $c$; also an opening 17 between the chambers $a$ and $b$. Thus a drying current may circulate between several chambers in succession but in so doing will move back and forth across said chambers so as to pass through the respective cars therein. The current, for example, passes through the car 7 in chamber $d$ to reach opening 15 and thence backwardly in chamber c through car 6 in order to reach opening 16 and thence back again in chamber b through car 5 to reach opening 17.

A supplemental casing 19 providing a chamber 20 is located next to the section A and directly in the rear of the same with an opening 21 between the chambers 20 and a, so that the drying current may pass from chamber a into chamber 20 and through the same. Said chamber 20 is preferably provided with a partition 22 extending part way across said chamber so as to cause a further crosswise circulation of the drying current. This makes a baffle arrangement by which the particles of solid matter are stopped to a large extent and prevented from entering the blower 25. A blower 25 is located adjacent to the casing 19 and arranged to receive a drying current circulating through and out of the same. A conduit or pipe connection 26 extends from the blower 25 and a heating chamber 27 is provided adjacent to and in the rear of the section D, said conduit 26 being connected with said casing 27. The latter provides a heating chamber 28 containing suitable heating devices such as the steam radiators 29 supplied by pipe connections 30. An opening 31 is provided between the chambers 28 and d so as to permit circulation of the drying current from the former to the latter. Thus the drying currents may be circulated continuously by the blower 25 through the conduit 26 into and through the chamber 28 and from the latter into and through the chambers d, c, b and a, in succession, and thence through the chamber 20 and back to the blower.

The casings B, C and D are preferably provided with inlet valves 32, 33 and 34, respectively, to permit the entrance of air from the outside. These inlets are provided with a series of apertures 35, with slidable apertured members 35ª, as shown in Fig. 2, which may be controlled to regulate the amount of air admitted through the several inlets.

Thus the air or other gas when circulated through the various chambers as above outlined by the blower 25 will have a drying effect upon the material in the cars 4, 5, 6 and 7 in said chambers a, b, c and d. The current will be hottest and have the lowest humidity in chamber d which is nearest to the heating chamber 28 with its heating devices and receives the heating current from same first. The opening 31 is of such size as to have a choking effect upon the air current passing through it from the chamber 28 to chamber d, as a result of which there is created a somewhat vacuous condition or partial rarefaction of the air in the chambers a, b, c and d, because of the action of the blower 25 drawing upon the air therein. Air is therefore drawn in from the outside through the inlets 32, 33, and 34, and this results in the lowering of the temperatures in the chambers a, b and c;— chamber c being lower than chamber d, chamber b lower than chamber c, and chamber a lower than chamber b. The inlets 32, 33 and 34 may be controlled to regulate or vary the temperatures of said chambers as desired. The temperature of the chamber d may, for example, be about 140°, that of the chamber c, 130°, of chamber b 120°, and of chamber a, 110°. The humidity is lowest in chamber d, and successively greater in the other chambers, c, b and a. The additional air drawn in through inlets 32, 33 and 34 must be expelled when the air is again circulated through the system, and this is done through the escape or discharge valve 40, (Fig. 7). This is a hinged valve with an adjustable weight 41, by which it may be adjusted to take care of the proper amount of discharge. Thus continual circulation of heated drying current will continue until the material in the car 7 in the end chamber d is dried sufficiently to fit it for the particular use desired. At this time a new car or truck will be pushed into the left hand chamber a, thereby advancing the cars 4, 5 and 6 into the next chambers to the right, and pushing the car 7 out of the apparatus. The material in the latter is then taken from the trays and used for such purpose as may be desired. The new car pushed into the chamber a is thereupon heated and its material partially dried and still another car being loaded with material on the outside ready to be pushed into the apparatus. When the material in this second car in chamber d is sufficiently dried this second car with fresh material is pushed in, thereby pushing out said second car from chamber d, and advancing all the other cars one chamber. This is kept up continually, new cars being pushed in and cars already in being treated consecutively in the four different chambers, and the cars with the finally treated product being pushed out from chamber d.

The various sections of the housing are preferably made separable, so that they may be shipped in a knock-down condition and then assembled. This also permits variation in the size of the apparatus. For instance, the casings 29 and 19 are made separable, as are also the sections A, B, C and D. The size of the apparatus may be varied by changing the number of such sections A, B, C and D.

This process and apparatus can be used very advantageously in dehydrating vegetables, fruits and the like, and permits the great bulk of the moisture to be removed from these articles so that their solid constituents can be preserved and shipped, thereby insuring the use of these articles and also permitting their transportation at very little expense.

It will be understood that changes and modifications may be made without departing from the spirit of the invention.

What we claim is:

1. An apparatus of the class specified comprising a housing provided with transverse partitions forming treatment chambers, receptacles for the material to be treated arranged in said chambers, a receptacle for each chamber, the ends of said receptacles being located at said cross partitions, said partitions being provided with openings forming passages between adjacent chambers, said openings being alternately on opposite sides of said receptacles so as to provide a path for a drying current through said chambers, and crosswise of the receptacles therein, and means for circulating a drying current through the path so formed, said circulating means comprising a blower at one end of the housing to receive the drying current from the same, and a heating chamber at the other end of the housing to receive air from said blower to pass the same into the adjacent treatment chamber.

2. An apparatus of the class specified comprising a housing having transverse partitions forming a plurality of serially arranged treatment chambers, receptacles for the material to be treated arranged in said chambers, a receptacle for each chamber, said receptacles being provided with means for exposing a considerable amount of material to be treated, said partitions being provided with apertures forming openings between the successive chambers on opposite sides of the receptacles therein, a heating chamber provided with a heating device adjacent the chamber at one end of the series, an air circulating device adjacent the treatment chamber at the other end of the series, and a conduit between said air circulating device and said heating chamber.

3. An apparatus of the class specified comprising a housing having transverse partitions forming a plurality of serially arranged treatment chambers, receptacles for the material to be treated arranged in said chambers, a receptacle for each chamber, said receptacles being provided with means for exposing a considerable amount of material to be treated, said partitions being provided with apertures forming openings between the successive chambers on opposite sides of the receptacles therein, a heating chamber provided with a heating device adjacent the chamber at one end of the series, an air circulating device adjacent the treatment chamber at the other end of the series, and a conduit between said air circulating device and said heating chamber, said treatment chamber being provided with inlet apertures and said conduit being provided with a regulatable outlet valve.

In witness whereof, we hereunto subscribe our names this 7th day of November, A. D. 1917.

JULIAN G. GOODHUE.
HERBERT L. TRUBE.